Nov. 20, 1956  P. F. HAYNER  2,771,062
TWO-STAGE DIFFERENTIAL SERVO VALVE
Filed Sept. 9, 1954
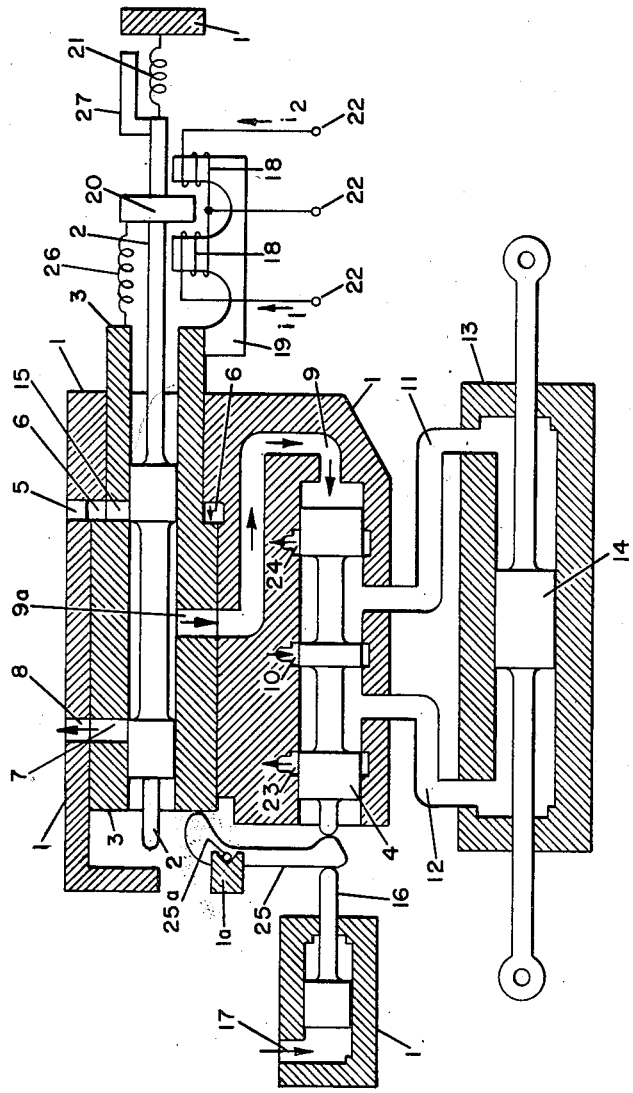
FIG. I
Paul F. Hayner
*INVENTOR.*
BY
Attorney though the intermediate valve is designed to control the flow of fluid through passages and includes at least one fluid control port. Means are provided including a pilot valve movably mounted with respect to the port for effecting motion of the intermediate valve with respect to the housing. Motor means couple and are carried by the intermediate and pilot valves for differentially displacing the valves in response to a control signal to provide a flow of fluid. Degenerative feedback means are provided responsive to the fluid flow and tending so to displace the intermediate valve relative the pilot valve as to oppose the flow of fluid.

In accordance with the invention, there is provided,

United States Patent Office 2,771,062
Patented Nov. 20, 1956

2,771,062

TWO-STAGE DIFFERENTIAL SERVO VALVE

Paul F. Hayner, Nashua, N. H., assignor to Sanders Associates, Incorporated, Nashua, N. H., a corporation of Massachusetts Application September 9, 1954, Serial No. 454,895

7 Claims. (Cl. 121—41)

This invention relates to the art of hydraulic control. More particularly, this invention relates to two-stage hydraulic amplifier valves such as are used in servo systems.

An hydraulic amplifier valve converts a relatively small input signal into a flow of fluid under substantial pressure. Ordinarily, a motor operates a pilot valve which, in turn, governs the operation of a control valve to regulate the output fluid flow. The term "fluid" as used herein includes gaseous and liquid substances.

In the prior art, in an hydraulic servo amplifier valve having internal feedback action, it is customary to displace the pilot piston by means of a motor, affixed to mechanical ground. In such conventional systems it is necessary for the motor to be capable of displacing the piston the full extent of its travel with respect to ground. In the improved valve described herein, a sleeve surrounding the piston, for example, moves in the same direction as the piston and tends to occlude ports which are opened upon movement by the piston. The instantaneous differential displacement between the piston and the sleeve is relatively small. A motor for displacing the piston with respect to the sleeve is required to perform very much less work than is true with the conventional valve arrangement.

It is an object of the present invention to provide an improved hydraulic servo valve having internal feedback which has high power amplification.

A further object of the present invention is to provide an improved hydraulic servo valve of the type described embodying a motor for displacing the control or output piston with a substantially linear relation between the input power force applied and the displacement obtained.

A still further object of this invention is to provide an improved hydraulic servo valve of the type described which is smaller, lighter and more compact, and which may be fabricated more economically than prior art devices.

Other and further objects of the invention will be apparent from the following description of a typical embodiment thereof, taken in connection with the accompanying drawing.

In accordance with the invention there is provided a two-stage differential servo valve. The valve comprises a valve housing including passages for fluid under pressure and an intermediate valve movably mounted within the housing. The intermediate valve is designed to control the flow of fluid through passages and includes at least one fluid control port. Means are provided including a pilot valve movably mounted with respect to the port for effecting motion of the intermediate valve with respect to the housing. Motor means couple and are carried by the intermediate and pilot valves for differentially displacing the valves in response to a control signal to provide a flow of fluid. Degenerative feedback means are provided responsive to the fluid flow and tending so to displace the intermediate valve relative the pilot valve as to oppose the flow of fluid.

In accordance with the invention, there is provided, further, an hydraulic servo amplifier valve adapted to control a source of fluid under pressure in response to an input control signal. The valve comprises a cylinder, a movable sleeve-valve in the cylinder and a piston-valve in the sleeve. Input ports in the sleeve-valve and cylinder connect the source of fluid with the interior of the sleeve. Output ports connect the interior of the sleeve to an output actuator device. Motor means are connected to the sleeve and piston for effecting relative displacement therebetween. Means are provided coupling the piston and the sleeve whereby displacement of the piston effects displacement of the sleeve, tending to oppose the flow of the fluid.

In the accompanying drawing, Fig. 1 is a schematic, cross-sectional view of a two-stage hydraulic servo amplifier valve which embodies the present invention and which is shown connected to an output cylinder under a no-signal-input condition.

With particular reference to the drawing, the casing 1 embodies a pilot cylinder having a reciprocating pilot piston-valve 2 surrounded by a reciprocating follow-up sleeve-valve 3 and a control cylinder which surrounds a reciprocating control piston-valve 4. A pressure port 5 is adapted to connect a source of fluid under pressure (not shown) to an annular chamber 6 surrounding the follow-up sleeve-valve 3. The chamber 6 is connected to the interior of the sleeve-valve 3 through a port 15 therein. Fluid is returned to exhaust through a port 7 of the sleeve-valve 3 and an exhaust port 8 in the casing. The pilot valve 2 is movably mounted relative the fluid control port in the sleeve-valve 3 to control the flow of fluid therethrough. The intermediate or sleeve-valve is movably mounted within the housing casing 1 for controlling the flow of fluid through the passages or ports 5, 8 and 9. The intermediate valve includes at least one fluid control port, for example, the port 15. The pilot piston-valve 2 is constrained by pressure exerted on it by a centering spring 21 which is suitably secured to the casing. All cylinders, as shown in the drawing, are joined to the same common mechanical ground.

An input electrical signal is coupled through terminals 22 to energize a solenoid force motor comprising solenoids 18 which are disposed about a permeable core 19, with windings, as shown. The armature is affixed to the intermediate valve 3. Armature 20 is actuated by the solenoids 18 upon the flow of unbalanced currents, $i_1$ and $i_2$, in their windings. The armature 20 is part of the pilot valve 2. The solenoid force motor thus comprises a motor means coupling and carried by the intermediate valve 3 and pilot valve 2 for differentially displacing the valves in response to a control signal to provide a flow of fluid. Depending upon the application, the input signal may be derived from a number of sources such as a gyro compass, a selsyn motor or potentiometer. For small signal applications a push-pull amplifier may be used to drive the solenoid coils. Where a potentiometer is applicable it may comprise, for example, a pair of variable potentiometers with their fixed resistances connected in parallel between a source of positive voltage and electrical ground. The variable taps would be connected to opposite terminals of the solenoids and the connection between the solenoids would be grounded. The potentiometers would be so connected that motion of a tap in a given direction would effect the application of an increasing current to one of the solenoids; motion of the other tap in the same direction would effect the application of a decreasing current to the other side. By connecting a third variable potentiometer with its fixed resistance between the two variable taps above and its variable tap electrically grounded, a more sensitive balancing control may be obtained. The armature 20 is affixed to the piston-valve 2, which controls ports 15 and 7 selectively to apply pressure to or exhaust a passage 9 which connects the interior of the sleeve-valve 3, through a port 9a, to the control piston-valve 4. A spring 26 is connected between the armature 20 and the sleeve-valve 3 to damp out mechanical oscillations between armature and the solenoids by overcoming the effective negative stiffness presented by the force motor. The stiffness of the spring 26 may be so chosen as to exceed the force acting on the armature when it is displaced relative to the solenoids a maximum amount. This piston-valve 4 selectively applies fluid under pressure from a pressure port 10, through conduits 11 and 12, to an output actuating device; here the output actuator comprises a cylinder 13 which contains a piston 14 as shown.

The piston-valve 4 is mechanically coupled through a feedback lever 25 to the follow-up sleeve-valve 3. The lever 25 is pivotally connected as indicated at 25a to a part of the casing indicated at 1a and has, for example, a leverage action of 10-to-1 as shown. The members so coupled together thus provide a degenerative feedback means responsive to the flow of fluid through the pilot cylinder and tending so to displace the intermediate valve relative the pilot valve as to oppose the flow of fluid. An extension 27 affixed to the piston-valve 2 provides a stop for the piston with respect to mechanical ground. The lever 25 in combination with piston valve stops provided by the casing 1, provide the valve with an unusual chip clearing ability as described in a copending application of Hayner et al., Serial No. 404,684 filed January 18, 1954. A compensating piston 16, under fluid pressure through a pressure port 17, functions as a hydraulic pressure spring to position the piston-valve 4. The piston 16 operates in conjunction with fluid pressure in the chamber 6 to apply a force tending to displace the piston-valve 4 to the right (as shown). The ports 23 and 24 in the control cylinder provide passages to exhaust the fluid when the piston-valve 4 is displaced. The pressure ports 5, 17 and 10 are connected together to the source of fluid pressure; exhaust ports 8, 23 and 24 have a common outlet (not shown).

The surface area of the sleeve-valve 3 against which the fluid in the annular chamber 6 exerts full pressure is only one-half of the surface area of the piston-valve 4 against which fluid in the passageway 9 exerts pressure. From the relation, $F=PA$, where F is the force, P the pressure, and A the area, it is clear that under maximum pressure conditions the force exerted against the piston-valve 4 is twice the opposing force exerted against the sleeve-valve 3 from the chamber 6. In this manner, an axial reciprocating control action is readily obtained.

In the neutral position, as in Fig. 1, the pilot piston-valve 2 occuldes the pressure port 15 and exhaust port 7 from the interior of the sleeve-valve 3. In this position approximately half of the total fluid pressure available is present in the interior of the sleeve-valve 3 and is applied through the port 9a and passageway 9 to exert a force tending to displace the control piston-valve 4 to the left. Since the force, due to the pressure in chamber 6 and tending to displace the follow-up sleeve-valve 3 to the left (as shown), is equal and opposite to the force caused by the pressure in passageway 9 acting on the piston-valve 4, the piston 4 is in mechanical equilibrium. The two force motor currents $i_1$ and $i_2$ are equal and opposite in character and cause no deflection of the force motor armature 20 from its central position. Since the control piston-valve 4 occludes exhaust ports 23 and 24 and pressure port 10, the forces acting on the output piston 14 are also in equilibrium.

When, in response to a deflection of the force motor armature, the pilot piston-valve 2 is displaced to the right, fluid under pressure is applied through the port 5, chamber 6, port 15, interior of the sleeve-valve 3, port 9a and passageway 9 to apply full pressure to displace the piston-valve 4 to the left and open the pressure port 10 and exhaust port 23. The fluid under pressure passes through the conduit 11 to deflect the output piston 14 to the left. Fluid in the cylinder returns through the conduit 12 and exhausts through port 23. When the piston-valve 4 is displaced to the left, the lever 25 causes the follow-up sleeve-valve 3 to be displaced to the right and occlude the port 15 to discontinue further displacement of the control piston-valve 4. The output piston 14 continues to move to the left until such time as the control piston-valve 4 is restored to its neutral position. In a closed-loop servo system the piston 14 is coupled to an output sensing device, such as a linear potentiometer (as shown, for example, in copending application of applicant, Serial No. 452,376 filed August 26, 1954), which restores the balance between $i_1$ and $i_2$ to cancel the initiating signal and restore the pilot piston-valve 2 and control piston-valve 4 to their neutral positions.

When the pilot piston-valve 2 is displaced to the left, in response to a deflection of the armature 20, the port 7 is opened to exhaust fluid in passageway 9 through the port 9a. Since the force acting from the right on the control piston-valve 4 from the right is thereby removed, fluid under pressure from the port 5 acting in chamber 6 displaces the follow-up sleeve-valve 3 to the left, which applies pressure through the lever 25 to displace the control piston-valve 4 to the right to open the pressure port 10 and exhaust port 24. Fluid under pressure is now applied through the conduit 12 to the left side (as shown) of the output piston 14 to displace it to the right; the fluid exhausts through the conduit 11 and port 24. The compensating piston 16 aids in displacing the control piston-valve 4 to the right.

In the hydraulic servo amplifier valve as described above, the differential displacement between the piston and the sleeve may be very small, for example, a thousandth of an inch. The total travel of the piston and sleeve relative to the casing may be 0.050 of an inch. By affixing the solenoid force motor to the sleeve and piston valves as shown, the displacement of the armature may be reduced by at least an order of magnitude. This condition approaches the ideal for maximum efficiency of the force motor in that very little motion of the armature is required. It has been experimentally determined that the effects of non-linearity of force versus deflection (force motor static characteristics) are entirely eliminated and dynamic non-linearities of this type are greatly reduced. For very small air gaps between the solenoids and the armature, the force motor size versus power handling capacity characteristic-curve falls very sharply. More explicitly, it is believed that the force motor size varies inversely with the third power of the force required and the third power of the displacement required.

The force required of the force motor is reduced in accordance with the structure of the present invention basically, because a constant displacement between the sleeve and piston is effected regardless of the amount of travel of the piston and sleeve. This permits the air gaps between the armature and the solenoids to be greatly reduced. Thus, a force motor as used in the prior art devices weighs approximately 24 ounces, and a force motor as used in the preferred embodiment need weigh no more than 2 ounces. This effects a tremendous economical advantage; the comparative costs involved in particular devices which have been utilized in practice, for example, are startling. A force motor as embodied in the prior art devices costs in the order of $300 as compared with 50 cents for a force motor such as is employed in accordance with the present invention.

When using a 1-to-1 feedback ratio between the piston 4 and sleeve 3, it has been found preferable structurally to eliminate the lever 25. The control-valve and pilot-valve are then concentric. The outside surface of the present follow-up sleeve then has a suitable configuration to permit the sleeve to function as the control piston-valve. Feedback is accomplished by returning the output of the pilot-valve (port 9 in the embodiment shown) to an end of the sleeve-valve 3 opposite the chamber 6. The output of the pilot-valve then operates in opposition to the bias pressure (as appears in the chamber 6 in the embodiment illustrated). The area of the opposite end of the sleeve-valve 3 in contact with the output of the piston-valve as described above is so chosen that the counteracting force is twice the bias force when full pressure is applied in both directions, tending to displace the sleeve-valve to the right. Of course, when zero pressure is applied to the opposite end of the sleeve, the bias pressure from the chamber 6 causes the sleeve-valve to be displaced to the left.

In the embodiment illustrated the piston-valve may have other configurations such as a tube or plug. The force motor as illustrated has a push-pull action. A single-ended force motor (solenoids connected in series) may be used in conjunction with a piston-valve armature from an end thereof. The force motor may also take the form of an axially mounted solenoid wherein the piston valve is the armature and the solenoid is affixed to the sleeve. In these designs a portion of the piston-valve adjacent the solenoid should, of course, be composed of a magnetically permeable material.

The force motor as embodied in the present invention may be fabricated in a smaller, lighter unit requiring far less input electrical power for the same output hydraulic power as has heretofore been possible in the prior art devices. The greatly decreased cost of the device as made possible by the present invention greatly enhances the utility of hydraulic amplifier valves; the advantages of hydraulic amplifier valves over other mechanisms may now be even more fully realized.

While there has been hereinbefore described what is at present considered a preferred embodiment of the invention it will be apparent that many and various changes and modifications may be made with respect to the embodiment illustrated without departing from the spirit of the invention. It will be understood, therefore, that all those changes and modifications as fall fairly within the scope of the present invention, as defined in the appended claims, are to be considered as a part of the present invention.

What is claimed is:

1. In a two-stage hydraulic servo amplifier valve having internal feedback and adapted to control a source of fluid under pressure in response to an input control signal, a pilot valve having a movable sleeve-valve and a movable piston-valve disposed within said sleeve-valve; a control valve having a second movable piston-valve; fluid passageways coupling said pilot-valve and control-valve whereby displacement of said first piston-valve effects displacement of said second piston-valve; means coupling said second piston-valve and said sleeve-valve for displacing said sleeve-valve in response to displacements of said second piston-valve for discontinuing the motion of said second piston-valve; and motor means connected to and carried by said sleeve-valve and said first piston-valve, for movement therewith, for effecting relative displacement therebetween.

2. An hydraulic servo amplifier valve adapted to control a source of fluid under pressure in response to an input control signal, comprising a cylinder; a movable sleeve-valve in said cylinder; a piston-valve in said sleeve-valve; input ports in said sleeve-valve and cylinder for connecting said source of fluid with the interior of said sleeve-valve; output ports for connecting the interior of said sleeve-valve to an output actuator device; motor means coupled to and carried by said sleeve-valve and piston-valve, for movement therewith, for effecting relative displacement therebetween; and means coupling said piston-valve and said sleeve-valve whereby displacement of said piston-valve effects displacement of said sleeve-valve tending to discontinue the connection between said source of fluid and the interior of said sleeve-valve.

3. An hydraulic servo amplifier valve adapted to control a source of fluid under pressure in response to an input electric control signal, comprising a cylinder; a movable sleeve-valve in said cylinder; a piston valve in said sleeve-valve; input ports in said sleeve-valve and cylinder for connecting said source of fluid with the interior of said sleeve-valve; output ports for connecting the interior of said sleeve-valve to an output actuator device; a solenoid force motor connected to and carried by said piston-valve and sleeve-valve for movement therewith, for effecting relative displacement therebetween in response to said input signal; and means coupling said piston-valve and said sleeve-valve whereby displacement of said piston-valve effects displacement of said sleeve-valve tending to discontinue the application of said fluid.

4. An hydraulic servo amplifier valve adapted to control a source of fluid under pressure in response to an input control signal, comprising a cylinder; a movable sleeve-valve in said cylinder; a piston-valve in said sleeve-valve; input ports in said sleeve-valve and cylinder for connecting said source of fluid with the interior of said sleeve-valve; output ports for connecting the interior of said sleeve-valve to an output actuator device; motor means comprising a pair of solenoids in spaced relation secured to said sleeve-valve and an armature disposed between said solenoids and secured to said piston-valve; and a linkage coupling said piston-valve and said sleeve-valve whereby displacement of said piston-valve effects displacement of said sleeve-valve tending to discontinue the application of said fluid.

5. A two-stage hydraulic servo amplifier valve having internal feedback and adapted to control the source of fluid under pressure in response to an input control signal comprising a first cylinder; a reciprocating sleeve-valve in said cylinder; a reciprocating piston-valve disposed within said sleeve-valve, a part of said piston being undercut; input ports in said sleeve-valve and cylinder for connecting said source of fluid with the interior of said sleeve-valve; a second cylinder integrally formed with said first cylinder; a second piston-valve within said second cylinder, a part of said second piston-valve being undercut; a passageway connecting the interior of said sleeve-valve with an end of said second piston-valve; ports for connecting the interior of said second cylinder with said source of fluid; ports connecting the interior of said second cylinder to an output actuator device; means coupling said second piston-valve and said sleeve-valve whereby displacement of said first piston-valve effects displacement of said second piston-valve which, in turn, effects displacement of said sleeve-valve in the same direction to said first piston-valve; and motor means responsive to said input control signal and connected to and carried by said sleeve-valve and said first piston-valve for effecting relative displacement therebetween.

6. In a two-stage hydraulic servo amplifier valve having internal feedback and adapted to control a source of fluid under pressure in response to an input control signal, a pilot valve having an axially reciprocating sleeve-valve and an axially reciprocating piston-valve disposed within said sleeve-valve; a control valve having a second axially reciprocating piston-valve; fluid passageways coupling said pilot-valve and control-valve whereby displacement of said first piston-valve effects displacement of said second piston-valve; means coupling said second piston-valve and said sleeve-valve for displacing said sleeve-valve in response to displacements of said second piston-valve for discontinuing the motion of said second piston-valve; and motor means connected to and carried by said sleeve-valve and said first piston-valve, for movement therewith, for effecting relative displacement therebetween.

7. A two-stage differential servo valve, comprising: a valve housing including passages for fluid under pressure; an intermediate valve movably mounted within said housing for controlling the flow of fluid through said passages and including at least one fluid control port; means including a pilot valve movably mounted with respect to said port for effecting motion of said intermediate valve with respect to said housing; motor means coupling and carried by said intermediate and pilot valves for differentially displacing said valves in response to a control signal to provide a flow of fluid; and degenerative feedback means responsive to said fluid flow and tending so to displace said intermediate valve relative said pilot valve as to oppose said flow of fluid.

References Cited in the file of this patent

UNITED STATES PATENTS

| 476,023 | McAdams | May 31, 1892 |
| 2,409,190 | Brown et al. | Oct. 15, 1946 |
| 2,470,099 | Hall | May 17, 1949 |

FOREIGN PATENTS

| 410,728 | Great Britain | Aug. 16, 1932 |